United States Patent [19]
Munroe

[11] Patent Number: 5,336,479
[45] Date of Patent: Aug. 9, 1994

[54] HIGH YIELD SODIUM HYDROSULFITE GENERATION

[75] Inventor: David C. Munroe, Beverly, Mass.

[73] Assignee: Morton International, Inc., Chicago, Ill.

[21] Appl. No.: 943,842

[22] Filed: Sep. 11, 1992

Related U.S. Application Data

[60] Continuation-in-part of Ser. No. 764,752, Sep. 24, 1991, Pat. No. 5,188,807, which is a division of Ser. No. 609,129, Nov. 1, 1990, Pat. No. 5,094,833, which is a continuation of Ser. No. 294,076, Jan. 5, 1989, abandoned.

[51] Int. Cl.$^5$ .............. B01F 5/00; C01B 17/66
[52] U.S. Cl. .................................................. 423/515
[58] Field of Search ........................................ 423/515

[56] References Cited

U.S. PATENT DOCUMENTS

| | | | |
|---|---|---|---|
| 3,985,674 | 10/1976 | Ellis et al. | 423/515 |
| 4,534,954 | 8/1985 | Little et al. | 423/515 |
| 4,680,136 | 7/1987 | Bernhard | 423/515 |
| 4,788,041 | 11/1988 | Sanglet | 423/515 |
| 4,859,447 | 8/1989 | Sanglet | 423/515 |
| 5,094,833 | 3/1992 | Ko et al. | 423/515 |

FOREIGN PATENT DOCUMENTS

| | | | |
|---|---|---|---|
| 660586 | 4/1963 | Canada | 423/515 |
| 0027369 | 10/1979 | European Pat. Off. | 423/515 |
| 3427297 | 7/1984 | Fed. Rep. of Germany | 423/515 |
| 8810334 | 12/1988 | World Int. Prop. O. | 423/515 |

*Primary Examiner*—Gary P. Straub
*Attorney, Agent, or Firm*—Nick C. Kottis; Gerald K. White

[57] ABSTRACT

An improved high yield process and apparatus for producing sodium hydrosulfite by simultaneously contacting a first reaction mixture of sodium borohydride, sodium hydroxide, and water with a second reaction mixture of an acidic sulfur-containing compound or precursors thereof used in producing sodium hydrosulfite from sodium borohydride.

7 Claims, 8 Drawing Sheets

PRIOR ART SYSTEM

PRIOR ART SYSTEM

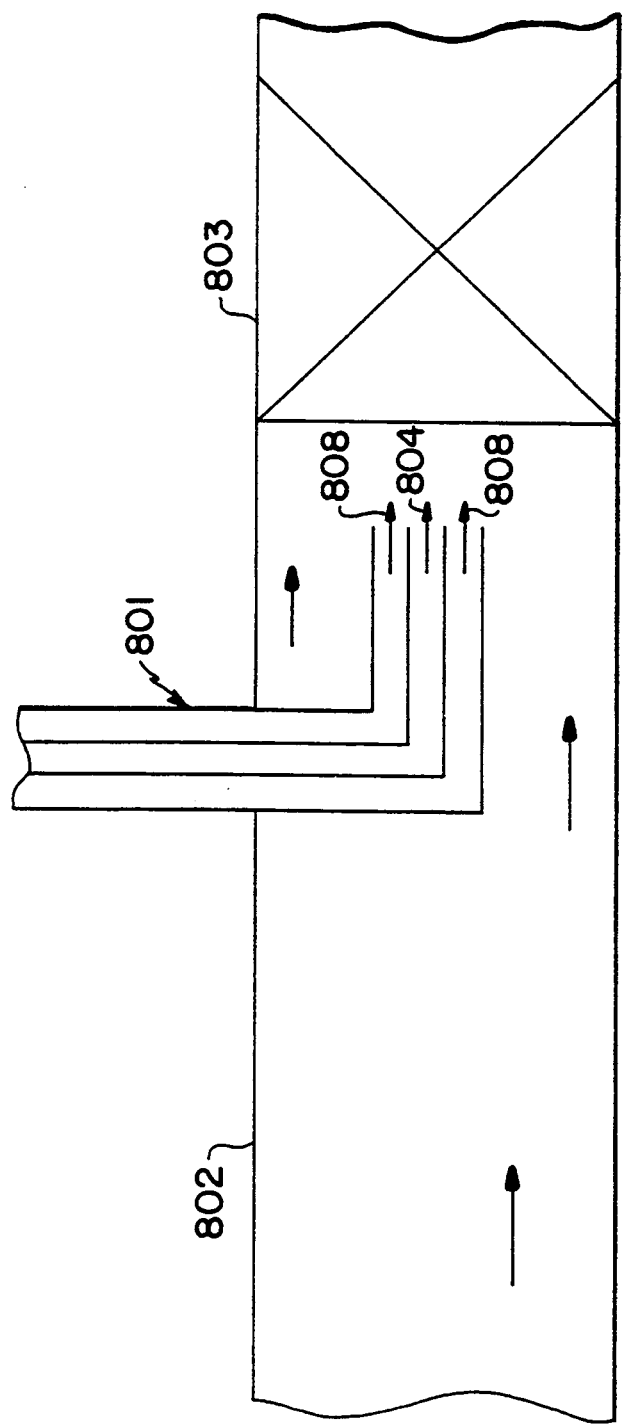

HIGH YIELD SODIUM HYDROSULFITE GENERATION

CROSS REFERENCE TO RELATED APPLICATION

This application is a continuation-in-part of application, U.S. Ser. No. 07/764,752, filed on Sep. 24, 1991, now U.S. Pat. No. 5,188,807, which in turn is a divisional of application U.S. Ser. No. 07/609,129, filed on Nov. 1, 1990, now U.S. Pat. No. 5,094,833, which in turn is a continuation of application U.S. Ser. No. 07/294,076, filed on Jan. 5, 1989, now abandoned.

BACKGROUND OF THE INVENTION

This invention relates generally to the production of sodium hydrosulfite and, more particularly, to an improved process and system for sodium hydrosulfite generation.

Sodium hydrosulfite, $Na_2S_2O_4$, also known as sodium dithionite, is extensively used as a bleaching agent in the paper and textile industries, and has a wide range of other uses. Because it is relatively unstable, it is generally produced in situ at the point of use, for example in a pulp mill.

Past methods used for producing sodium hydrosulfite have included dissolving zinc in a solution of sodium bisulfite and precipitating zinc-sodium sulfite with milk of lime to leave the hydrosulfite in solution, and reacting sodium formate with sodium hydroxide and sulfur dioxide.

More recent processes include mixing caustic soda and sulfur dioxide with sodium borohydride in an aqueous medium to produce an aqueous solution of sodium hydrosulfite. The sodium borohydride generally enters the process in a mixture with aqueous sodium hydroxide. This mixture, obtainable from Morton International, Inc under the registered trademark "BOROL" has excellent stability because acid hydrolysis of the sodium borohydride is greatly minimized. The sodium borohydride-containing mixture typically comprises 10–15 wt. % sodium borohydride, 35–45 wt. % sodium hydroxide, and 40–55 wt. % water. A typical mixture comprises 12 wt. % sodium borohydride, 40 wt. % sodium hydroxide, and 48 wt. % water. For convenience, this type of process will be referred to hereinafter as the BOROL process.

The theoretical reaction of the BOROL process, assuming ideal conditions and 100% yield, would be as follows:

$$NaBH_4 + 8NaOH + 8SO_2 \rightarrow 4Na_2S_2O_4 + NaBO_2 + 6H_2O$$

There is, however, a side reaction in which sodium borohydride is hydrolyzed:

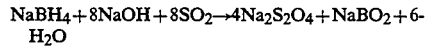

This side reaction is a function of pH, with the rate of the side reaction increasing with reduced pH, and acts to reduce the overall efficiency of the process. In practice, however, this competing side reaction cannot be overcome simply by raising the pH as higher pH would adversely affect the main reaction.

The desired reaction, to produce sodium hydrosulfite, can be viewed as effectively taking place in two stages, as follows:

(a) a reaction between sulfur dioxide and caustic soda to give sodium bisulfite (1); and
(b) a reaction between the bisulfite and sodium borohydride to give sodium hydrosulfite (2).

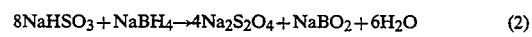

There is also an equilibrium (3) between the bisulfite and sodium sulfite, which is a function of the pH:

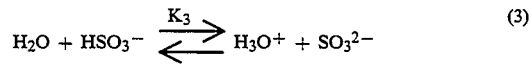

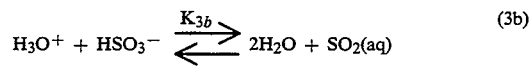

$K_3 = 1.02 \times 10^{-7}$ (18° C.)
$K_{3b} = 1.54 \times 10^{-2}$ (18° C.)

The pH flow profile becomes significant when related to the hydrolysis rate of the $NaBH_4$. As can be seen by referring to Table 1 set forth below, the rate at which $NaBH_4$ undergoes hydrolysis increases dramatically as the pH of the $NaBH_4$-containing solution decreases. For example, the half-life of $NaBH_4$ is about 3000 times longer at a pH of 6.0 compared to that at a pH of 2.5. Therefore, if the BOROL solution is added to a process stream having a lower pH than that of the BOROL solution, the extent to which the $NaBH_4$ in BOROL solution undergoes undesired side reaction, e.g., hydrolysis to form $NaBO_2$, typically increases, with the rate of hydrolysis typically increasing dramatically as the pH of process stream is decreased. Consequently, when the BOROL solution is added to a process stream of lower pH e g , having a reaction pH of about 5.5–6.5 (such as in U.S. Pat. Nos. 4,788,041 and 5,094,833, for example) or even more so a pH in the range of about 2 to 3, the extent of the hydrolysis of the $NaBH_4$ is increased.

TABLE 1

| NaBH4 HYDROLYSIS | |
|---|---|
| pH | NaBH4 HALF-LIFE |
| 2.5 | 0.00012 SEC |
| 4.0 | 0.0037 SEC |
| 5.0 | 0.037 SEC |
| 5.5 | 0.12 SEC |
| 6.0 | 0.37 SEC |
| 6.5 | 1.2 SEC |
| 7.0 | 3.7 SEC |
| 8.0 | 36.8 SEC |
| 9.0 | 6.1 MIN |
| 10.0 | 61 MIN |
| 12.0 | 4.3 DAYS |
| 13.0 | 42.6 DAYS |
| 14.0 | 430 DAYS |
| BOROL of: | |
| 12 wt % NaBH4 40 wt % NaOH 48 wt % H2O | 14,000 YEARS |

TEMPERATURE = 25° C. (77° F.)
LOG (t ½) = pH - (0.034 T - 1.92)
t = MINUTES
T = °K.

All such sodium hydrosulfite generating processes generally operate within a pH range of about 5 to about 7 and within which pH range the lowering of the pH will generally favor the formation of bisulfite.

Consideration of this equilibrium, therefore, has to be weighed against that of acid hydrolysis discussed above to determine the optimum pH for the process. In such prior processing, a pH of 6.5 has been found to give the best yield. Nevertheless, it has proved difficult to achieve yields greater than about 85%.

In one previous sodium hydrosulfite generation process, $SO_2$, water, sodium hydroxide (NaOH), and a sodium borohydride/sodium hydroxide/water mixture (BOROL) are fed in that order into a flow line which leads to a static mixer and then to a degassing tank where entrained gases are vented to the atmosphere. An aqueous solution of sodium hydrosulfite is pumped from the degassing tank, a portion of which is delivered to a storage tank for use as required and the balance of which is recirculated to the flow line at a position downstream of the $SO_2$, water and NaOH inlets but upstream of the BOROL mixture inlet. The input of each reactant can be controlled automatically in response to rising or falling levels in the degassing tank or the storage tank or changes in pressure, flow rates, and/or pH.

Commonly assigned U.S. Pat. No. 4,788,041 depicts an improvement to the above-discussed process. This improvement obtains higher sodium hydrosulfite yields through variations in the proportions of chemicals, pH and temperature measurement and control, and specific changes in the recirculation system.

Commonly assigned U.S. Pat. No. 5,094,833 also relates to an improved process and apparatus for producing sodium hydrosulfite in higher yields. In one embodiment disclosed therein, an inverse order of addition of raw materials, i.e., a first mixture comprising sodium borohydride, sodium hydroxide, and water is introduced prior to a second mixture comprising water and sulfur dioxide, is used to achieve such desirable improvement.

FIG. 1 depicts a typical pH flow profile through the mixing and reaction zones of such sodium hydrosulfite generation process streams. In the prior art as illustrated in FIGS. 2 and 3, mixture of water and $SO_2$ and solution of sodium hydroxide are added to the process stream upstream of the addition of the BOROL solution ($NaBH_4/NaOH/H_2O$) thereby creating an acidic medium having a pH of about 2.5, into which the BOROl solution is added. similarly, referring to FIG. 4, the solution of sodium bisulfite and sulfur dioxide when added to the process stream creates an acidic medium (pH 2.5) to which the BOROL solution is added. After the BOROL solution is added to the process stream, the pH of the process stream increases to the desired reaction pH. This pH flow profile is illustrated in FIG. 1 by the line graph labeled "Prior Art #1".

In accordance with the processing disclosed in U.S. Pat. No. 5,094,833, discussed above, the BOROL solution and NaOH solution are added to the process stream upstream of the addition of the mixture of water and sulfur dioxide, thus creating an alkaline medium (pH=13.0) into which the mixture of water and sulfur dioxide is added. After the addition of the water and sulfur dioxide mixture, the pH of the process stream decreases to the desired reaction pH. This pH flow profile is illustrated in FIG. 1 by the line labeled "Prior Art #2".

While the processing disclosed in U.S. Pat. No. 5,094,833 results in the generation of sodium hydrosulfite in high yield as compared to prior art processing, the generation of sodium hydrosulfite in still greater yields is desired.

SUMMARY OF THE INVENTION

A general object of the invention is to provide an improved process and system for the production of sodium hydrosulfite in high yield.

A more specific objective of the invention is to overcome one or more of the problems described above.

The general objective of the invention can be attained, at least in part, through a method involving simultaneously contacting a first reaction mixture of sodium borohydride, sodium hydroxide and water with a second reaction mixture of an acidic sulfur-containing compound or precursors thereof used in producing sodium hydrosulfite from sodium borohydride to form an aqueous solution of sodium hydrosulfite.

The prior art fails to show or suggest processing and systems for the generation of sodium hydrosulfite in high yield wherein the alkalinity of the sodium borohydride-containing mixture is at least maintained prior to the introduction of the mixture containing an acidic sulfur-containing compound or precursors thereof used in producing sodium hydrosulfite from sodium borohydride. This is especially significant in view of the known dramatic increase in the hydrolysis rate of $NaBH_4$ as the alkalinity of the process stream is reduced as compared to that of the BOROL sodium borohydride-containing solution and, more specifically, as the pH of the process stream is significantly reduced below a pH of 14.

The invention further comprehends a method for producing sodium hydrosulfite including the steps of:
a) establishing a process flow stream including an aqueous mixture of at least sodium hydrosulfite and sodium bisulfite; and
b) simultaneously contacting the process flow stream with a first reaction mixture including sodium borohydride, sodium hydroxide, and water and a second reaction mixture including:
  i) an aqueous solution of sodium bisulfite and sulfur dioxide,
  ii) sulfur dioxide and water, or
  iii) an aqueous solution of sodium bisulfite and sulfuric acid.

With such contacting, the first and second reaction mixtures react to form an aqueous solution of sodium hydrosulfite.

The invention also comprehends corresponding systems for producing sodium hydrosulfite. In one embodiment, such a system includes a source of a first reaction mixture of sodium borohydride, sodium hydroxide and water. The system also includes a source of a second reaction mixture including an acidic sulfur-containing compound or precursors thereof used in producing sodium hydrosulfite from sodium borohydride. The system further includes means for simultaneously contacting the first and second reaction mixtures to form an aqueous solution of sodium hydrosulfite.

In another embodiment of the sodium hydrosulfite production system of the invention, the system includes a flow line of a process stream of at least sodium hydrosulfite. The system also includes an input nozzle for simultaneously introducing into the flow line both a first reaction mixture of sodium borohydride, sodium hydroxide and water and a second reaction mixture containing an acidic sulfur-containing compound or precursors thereof used in producing sodium hydrosulfite from sodium borohydride. The second reaction mixture includes either:
  i) an aqueous solution of sodium bisulfite and sulfur dioxide,
  ii) sulfur dioxide and water, or
  iii) an aqueous solution of sodium bisulfite and sulfuric acid.

In such a system, the alkalinity of the sodium borohydride-containing mixture is at least maintained prior to the simultaneous introduction of the second reaction mixture. The input nozzle includes a central port which emits the first reaction mixture into the flow line. The nozzle also includes an outer annular port which emits the second reaction mixture into the flow line coincident to the emission of the first reaction mixture from the central port. Further, the annular port and the central port of the nozzle are concentric.

As used herein, references to "simultaneously" or "simultaneous" contact or introduction are to be understood to refer to the addition, mixing and/or contacting of the specified mixtures within a time period of no more than about 0.15 seconds, preferably within a time period of no more than about 0.10 seconds.

Other objects and advantages of the invention will be apparent to those skilled in the art from the following detailed description taken in conjunction with the appended claims and drawings.

BRIEF DESCRIPTION OF THE DRAWINGS

FIG. 8 is a simplified schematic drawing of an input nozzle in accordance with one embodiment of the invention with associated process apparatus.

DETAILED DESCRIPTION OF THE INVENTION

As will be more apparent from the information below and the Examples, this invention is an improvement that is believed to be applicable to all prior art processes for generating sodium hydrosulfite through the reaction of sodium borohydride, sodium hydroxide, and a reaction mixture of an acidic sulfur-containing compound of precursors thereof used in producing sodium hydrosulfite from sodium borohydride. The improvement obtained by the invention is that of improving the yield of sodium hydrosulfite, as measured by mass balance. The improvement is obtained by utilizing a system that requires the simultaneous introduction of both a first mixture comprising sodium borohydride, sodium hydroxide, and water and a second mixture comprising an acidic sulfur-containing compound or precursors thereof used in producing sodium hydrosulfite from sodium borohydride, e.g., water and sulfur dioxide. The aforementioned prior art systems all introduce the above-mentioned mixtures in sequential order.

The present invention, by means of the processing and system disclosed herein, is directed to the simultaneous introduction/contacting of the sodium borohydride-containing reaction mixture with an acidic sulfur-containing or precursor thereof mixture and thereby minimizes and preferably avoids reducing the alkalinity of the sodium borohydride-containing reaction mixture prior to the sodium hydrosulfite generation reaction. Minimizing the exposure of sodium borohydride to low pH gradients prior to the reaction to form sodium hydrosulfite, as described above, is important to minimize the hydrolysis of the $NaBH_4$. This can be accomplished by providing the simultaneous introduction/contacting of chemical reactants and thereby minimize the time and distance between chemical reactant addition. Such simultaneous introduction/contacting can be realized by means of input nozzles, as described below, for example.

Figure 1:
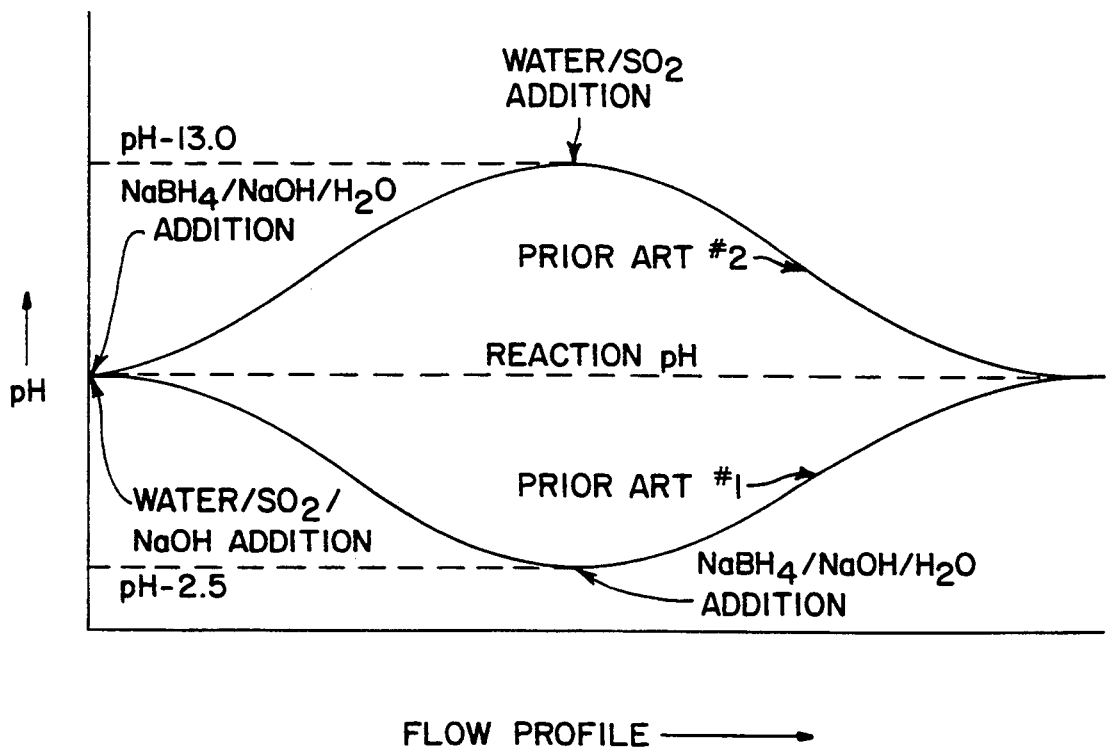
FIG. 1 is a graphical depiction of process stream pH as a function of process flow profile.

Again, referring to FIG. 1 and Table 1 and as shown thereby, by at least maintaining the alkalinity of the sodium borohydride-containing mixture prior to contact with the acid sulfur-containing compound or precursors thereof used in producing sodium hydrosulfite from sodium borohydride, e.g.,
  i) an aqueous solution of sodium bisulfite and sulfur dioxide,
  ii) sulfur dioxide and water, and
  iii) an aqueous solution of sodium bisulfite and sulfuric acid, the extent of hydrolysis of sodium borohydride is better limited and thus the present invention is directed to limiting exposure of the sodium borohydride to the lower pH's involved in sodium hydrosulfite generation to such time periods when the sodium hydrosulfite generation reactants are present, e.g., to such time as when the reactants are all present and at the reaction pH. Thus, through the practice of the invention, the sodium borohydride will typically be exposed to the lower, reaction pH only when all reactants are present and the pH of the process stream will not significantly deviate from the reaction pH throughout the period of time during which the reaction of sodium borohydride to form sodium hydrosulfite occurs.

Figure 2:
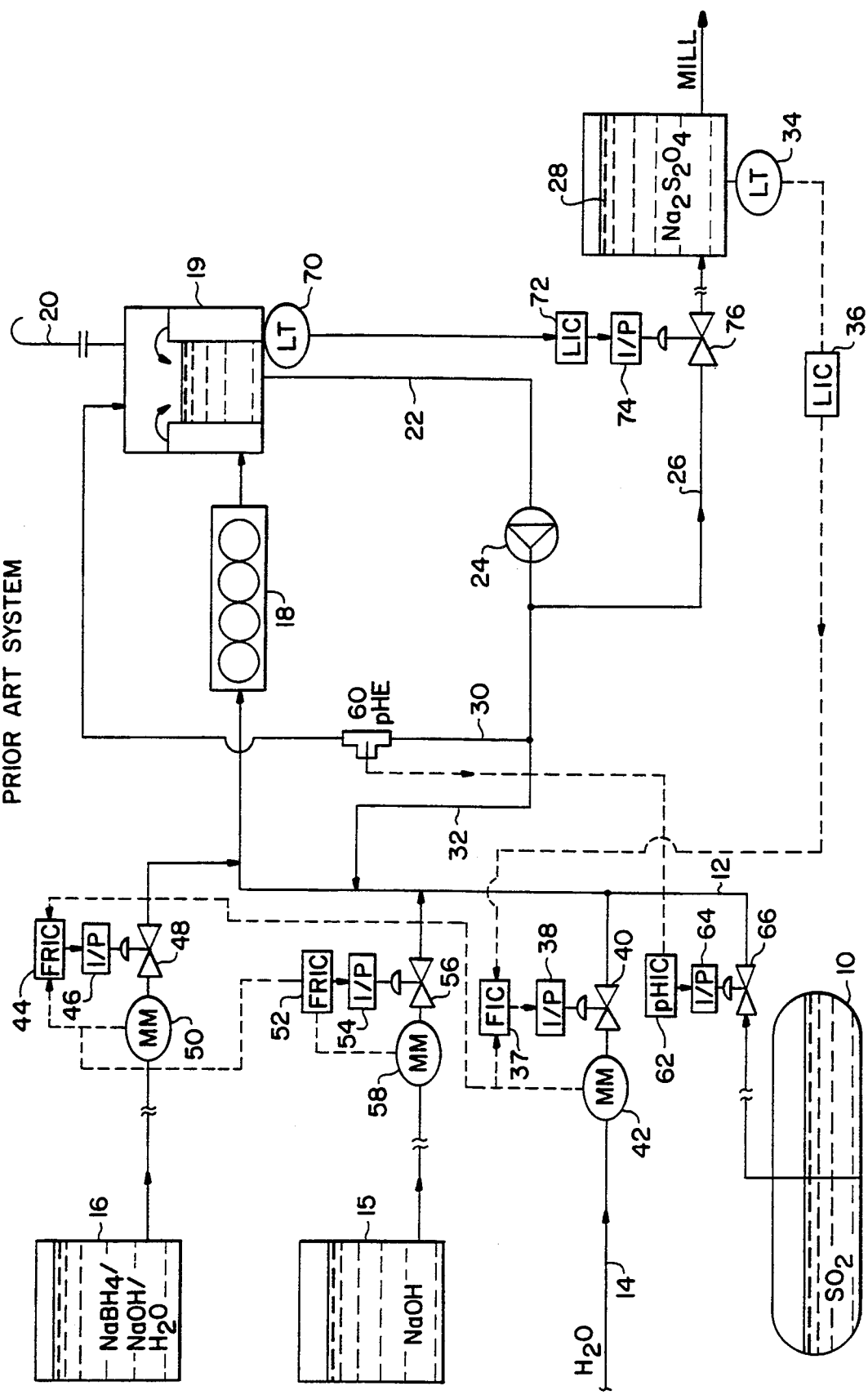
FIG. 2 is a flow diagram illustrating a prior art process described above.

A typical prior art system is shown in FIG. 2 wherein a flow line 12 is fed with liquid sulfur dioxide from a tank 10, water from a supply line 14, sodium hydroxide from a storage tank 15, and a sodium borohydride, sodium hydroxide, and water mixture from a storage tank 16. When sodium hydroxide joins the flow line 12, reaction (1) referred to above occurs to generate sodium bisulfite. When the BOROL mixture joins the system further downstream, the reaction (2) commences to generate sodium hydrosulfite. The reaction mixture is fed to a static (motionless) mixer 18 and then to a degassing tank 19 from which gaseous products such as hydrogen are vented from the system to the atmosphere through a vent pipe 20.

A flow line 22 leads from the bottom of the degassing tank 19, the sodium hydrosulfite solution from the degassing tank being circulated through this flow line by a pump 24. Downstream of the pump, the flow line is divided into a first line 26 leading to a hydrosulfite storage tank 28 and a second line 32, which recycles a proportion of the hydrosulfite solution to the flow line 12, downstream of the sodium hydroxide input but upstream of the BOROL mixture input. A minor proportion of the solution from the flow line 32 is drawn off along a flow line 30 and recirculated directly to the degassing tank 19.

A pulp mill or the like (not shown) is fed with sodium hydrosulfite directly from the storage tank 28. As hydrosulfite solution is drawn off from this tank, the fall in level is sensed by a level transmitter (LT) 34 which sends an electrical signal to a level indicator control (LIC) 36 which in turn transmits a signal to a flow indicator control (FIC) 37 which in turn operates a current/pressure transducer (I/P) 38 which operates a pressure valve 40 to increase the flow of water to the system.

The flow of water through the input line 14 is sensed by a magnetic flow meter (MM) which sends a signal to the FIC 37 to regulate the flow, and also to a flow ratio indicator control (FRIC) 44 which controls the supply of BOROL via an I/P transducer 46 which operates a pressure valve 48. The flow of BOROL mixture is sensed by a magnetic flow meter 50 which sends a signal to the FRIC 44 and to a FRIC 52 which controls the input of NaOH via an I/P transducer 54 and a pressure valve 56. The flow of NaOH into the system is also monitored by a magnetic flow meter 58 which sends a flow measurement signal back to the FRIC 52.

The various control functions 36, 37, etc., are shown for simplicity in FIG. 2 as individual microprocessor functions. In practice, of course, all these functions are likely to be performed by a single central process computer.

The input of $SO_2$ to the system is controlled as a function of the pH in the recirculating reaction mixture. The pH of the solution in the branch pipe 30 is monitored by a pH electrode (pHE) 60 which sends a signal to a pH indicator control (pHIC) 62 which controls the input of $SO_2$ by means of an I/P transducer 64 and a pressure valve 66. This prior art process is generally operated at a pH of about 6.5. If the monitored pH rises above the predetermined value, the pHIC 62 will act to increase the flow of $SO_2$ and similarly if the pH falls, the input of $SO_2$ will be reduced.

If the level in the degassing tank 19 falls below a predetermined level, a level transmitter 70 will send a signal to a level indicator control 72 to reduce the flow of hydrosulfite through the flow line 26 to the storage tank 28, by means of an I/P transducer 74 and a pressure valve 76.

Using the typical BOROL solution having the composition specified above, in which the molar ratio of NaOH to $NaBH_4$ is 3.2:1, the overall equation for reactions (1) and (2) above becomes:

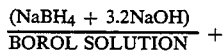

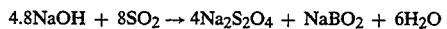

On this basis, assuming an overall reaction efficiency for the above prior art process of 85%, the actual quantity of each reactant required to produce one kilogram of 100% active sodium hydrosulfite is shown to be:
  0.533 kg BOROL mixture
  0.325 kg NaOH (based on 100%) and
  0.865 kg $SO_2$.

The amount of water depends on the desired concentration of the final hydrosulfite solution, which is usually 2 to 6 wt. %.

Figure 3:
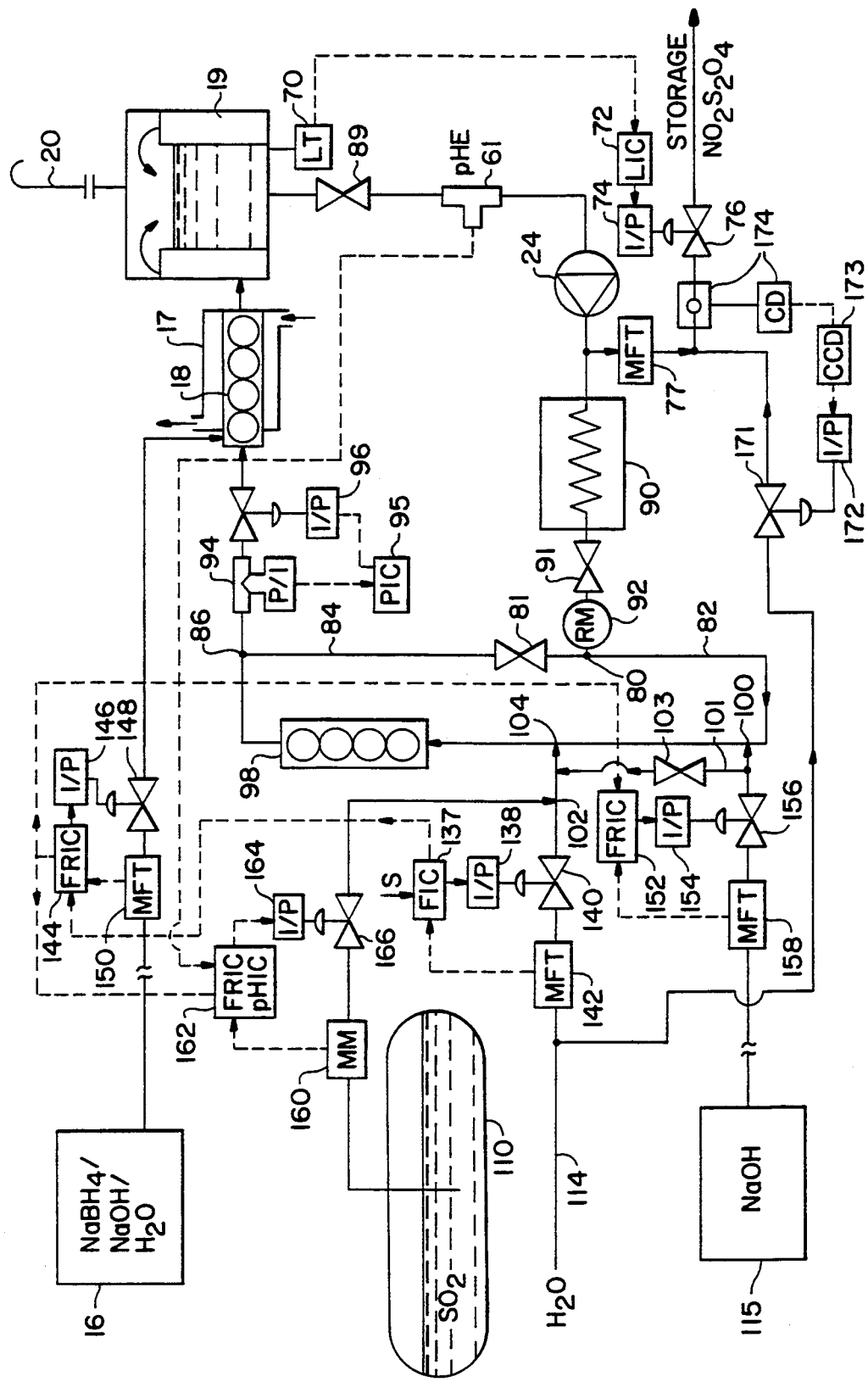
FIG. 3 is a flow diagram illustrating a prior art process as described in U.S. Pat. No. 4,788,041.

Another typical prior art system, that of U.S. Pat. No. 4,788,041, is illustrated in FIG. 3. Referring to FIG. 3, certain features which are essentially identical to those shown in FIG. 2 are given the same reference numerals and will not be described in detail. As in the embodiment of FIG. 2, sodium hydroxide, water, and sulfur dioxide are mixed to initiate the production of sodium bisulfite and BOROL mixture is then added, the reaction mixture being passed through a static mixer 18 and then to a degassing tank 19. The mixture entering the static mixer is preferably at a temperature of about 10° C. The static mixer 18 has a water cooling jacket 17, whereby the temperature of the reaction mixture is reduced to about 8° C. Again, the flow of sodium hydrosulfite solution from the degassing tank to storage is controlled by the level transmitter 70, the LIC 72, the I/P transducer 74, and the pressure valve 76. There is also provided a control valve 89 and a magnetic flow tube (MFT) 77 so that the flow rate of hydrosulfite to storage can be monitored.

The concentration of the hydrosulfite leaving the recirculation stream is generally in the range of 9–12 wt. %. Increased yields can be obtained by operating the process at this relatively high concentration, but storage stability is reduced. Therefore, if the hydrosulfite is not to be used immediately, it should be diluted down to a concentration of 4–5 wt. %. For this purpose, water is supplied and tapped off from a main water supply line 114. The supply of diluting water to the hydrosulfite solution is controlled by a valve 171 operated by an I/P transducer 172 and a conductivity control microprocessor (CCD) 173 which monitors the concentration of the solution, downstream of the input of diluting water, by means of a conductivity cell 174. The pump 24 for the recirculated stream of hydrosulfite in this embodiment is positioned downstream of the pH electrode 61, which controls the input of $SO_2$ as will be described below. Downstream of the pump 24, and at the point at which hydrosulfite is drawn off to storage, the solution passes through a heat exchanger 90, another control valve 91, and a rotameter 92. The heat exchanger cools the reaction mixture from about 12° C., to which temperature it has risen as a result of the exothermic reaction, to about 7° C. The flow line is then divided at a point 80 into a first and a second flow line 82, 84 respectively. A manually-controlled valve 81 in the flow line 84 controls the relative proportions of the flow passing through the two flow lines. Preferably 20–60% of the flow, typically 40%, passes through the first flow line 82 and 49–80% typically 60%, through the second flow line 84.

Sodium hydroxide from a supply tank 115 is fed into the flow line 82 at a point 100. $SO_2$ from a supply tank 110 joins the water supply line 114 at a position 102 and the resulting mixture is fed into the flow line 82 at a position 104, downstream of the NaOH input rather than upstream as in the previous BOROL process. The reaction mixture then passes through a static mixer 98 and into the main static mixer 18 where BOROL mixture from the supply tank 16 is fed into the system. A second flow line 84 rejoins the flow line 82 at a position 86 between the two static mixers 98, 18. The flow rate of the recirculating mixture entering the static mixer 18 is monitored by a pressure indicator (PI) 94 which sends a signal to a pressure indicator control (PIC) 95 which in turn feeds a signal to an I/P transducer 96 which operates a pressure valve 97 controlling the flow to the static mixer 18.

To reduce still further the change in pH as the SO₂ joins the recirculation stream a proportion of the NaOH (suitably 10-50% of the total NaOH flow and preferably 35-40%) is fed through a bypass line 101 to the SO₂ input line, joining this line downstream of the position 102 at which the SO₂ joins the water flow. The flow through the bypass line is controlled by a valve 103, which may be operated automatically in response to monitored flow rates of water, NaOH and SO₂.

The hydrosulfite storage tank 28 of FIG. 2 is not shown in FIG. 3, but it will be understood that the system of FIG. 3 may feed a storage tank in exactly the same way as in FIG. 2.

The system of FIG. 3 has an automatic control system operating in a similar way to that of FIG. 2. Input signals S, which may correspond to level signals from a storage tank as in FIG. 2, are fed to a FIC 137, which in turn sends signals to an I/P transducer 138 to operate a pressure valve 140 in the water feed line 114. The FIC 137 also receives the flow rate data from a magnetic flow tube (MFT) 142 in the water flow line, and transmits flow data to a FRIC 144 which controls the supply of BOROL mixture to the static mixer 18 by means of an I/P transducer 146 and pressure valve 148 monitoring the flow rate by means of a MFT 150.

Flow rate data for water and the BOROL mixture are also transmitted by the FRIC 144 to a FRIC 152 and to a combined FRIC and pH indicator control 162 which control the input of sodium hydroxide and sulfur dioxide, respectively. The FRIC 152 controls the input of NaOH by means of an I/P transducer 154 and a pressure valve 156 and monitors the input of NaOH by means of a magnetic flow tube 158. The control unit 162 also receives pH data from the pH electrode 61, as well as from a micro-massmeter 160 which monitors the flow rate of SO₂. This flow rate is controlled by means of an I/P transducer 164 and a pressure valve 166.

The signals to the I/P transducer 164 from the control unit 162 are preferably determined to a much greater extent by the flow ratio data than by the pH data. Suitably the signals are based to an extent of 75-85%, preferably about 80%, on flow ratio data and 15-25%, preferably about 20%, on pH data.

By splitting the recirculation stream at the location 80, a more balanced input of reactants is obtained since there is less difference in volume between the recirculated stream and the reactants entering it. There is also a less drastic dilution of the reactants.

Figure 4:
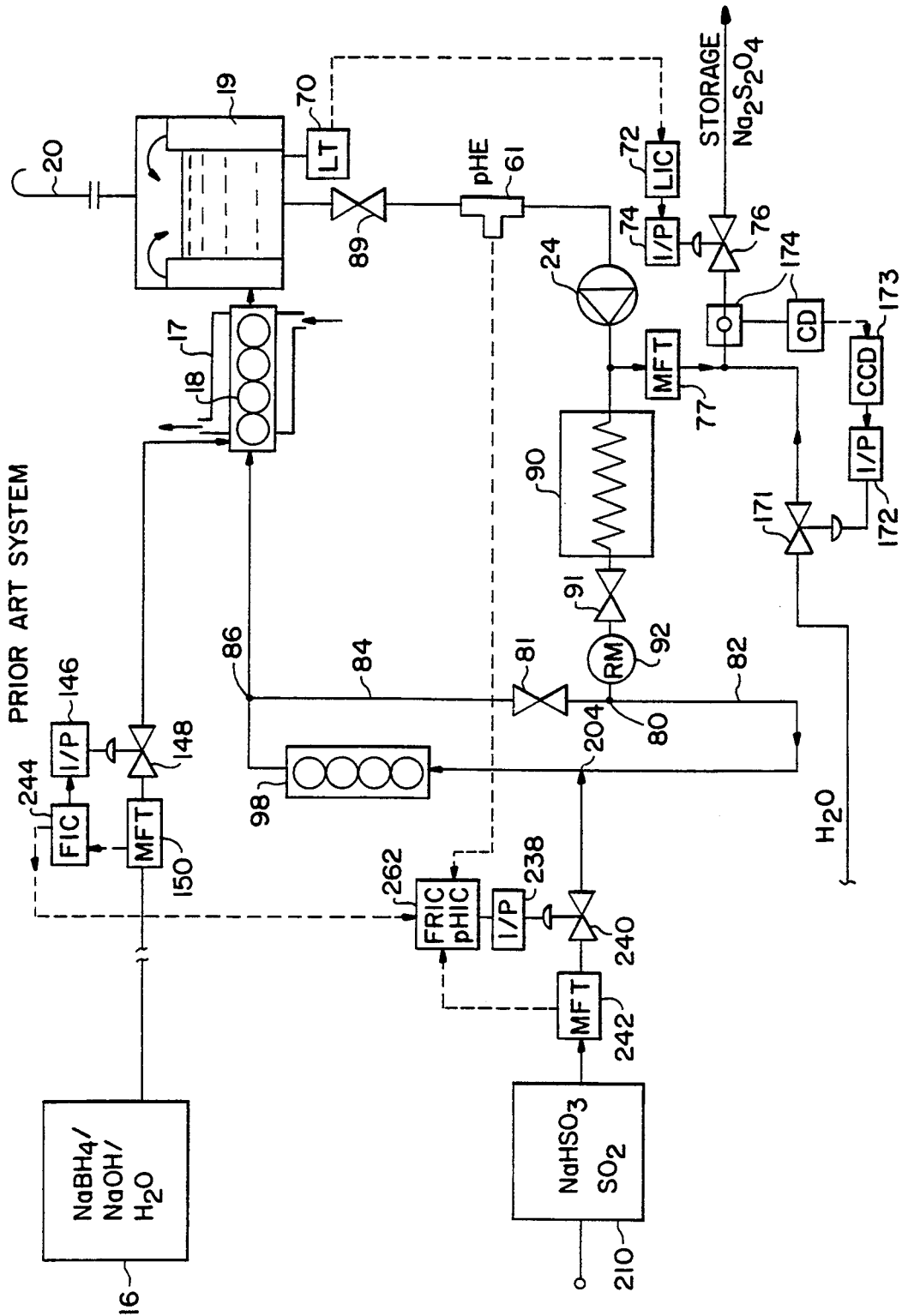
FIG. 4 is a flow diagram illustrating another prior art process described in U.S. Pat. No. 4,788,041.

The system shown in FIG. 4 uses, instead of separate inputs of NaOH, SO₂ and water, a single input of an aqueous solution of sodium bisulfite and sulfur dioxide. In FIG. 4, components which are identical to those of FIG. 3 are given the same reference numerals and will not be described in detail. This system is similar to that of FIG. 3 insofar as it comprises a recirculation system with a cooled static mixer 18, a degassing tank 19, a pump 24, a draw-off point and diluting system for the product, a heat exchanger 90 and a split stream comprising an input line 82 and a bypass line 84.

The input line 82 has a single input point 204 for an aqueous SO₂/NaHSO₃ solution from a supply 210. The flow of this solution is controlled by a valve 240 actuated by an I/P transducer 238 which in turn is controlled by a FRIC/pHIC 262. This unit receives signals from the pH electrode 61 as in the system of FIG. 3, and also from a magnetic flow tube 242 monitoring the flow rate of the bisulfite/SO₂ solution and from a FIC 244 which monitors the flow of sodium borohydride solution to the system. This latter unit replaces the FRIC 144 of FIG. 3 since it receives only the flow rate data from the magnetic flow tube 150. As in the system of FIG. 3, the control unit 262 preferably controls the input of the bisulfite/SO₂ solution to an extent of about 80% on the basis of flow ratio data and 20% on the basis of pH data.

Taking into consideration that the system operates under a slight excess of bisulfite (typically a 10-15% excess), the balanced equation (based on 90% yield) can be transformed into:

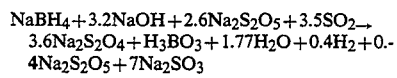

Based on this equation, the actual quantity of each material required to produce one kilogram of 100% active hydrosulfite is shown to be:

0.503 kg BOROL mixture
0.332 kg NaOH (at 100%) and
0.889 kg SO₂.

While there are various different ways in which the percentage yield obtained by the process of the invention can be calculated, the mass balance method will be used in this application.

This method of determining yield is based on the stoichiometry of the balanced equation for conversion of the BOROL solution reactant feed to the hydrosulfite product. At 100% conversion, 1 part of the BOROL solution reactant will produce 2.208 parts of hydrosulfite. The theoretical concentration of product hydrosulfite solution expressed as percent by weight is the quotient of the mass of hydrosulfite produced at 100% conversion of the BOROL solution reactant and the total mass of the reactant chemical feeds.

The actual concentration of the product hydrosulfite solution is determined by titration to determine the actual hydrosulfite content expressed as percent by weight. The percent yield is then calculated as the quotient of the actual hydrosulfite concentration and the theoretical concentration as determined by the stoichiometry of the balanced equation and reactant chemical feeds.

Figure 5:
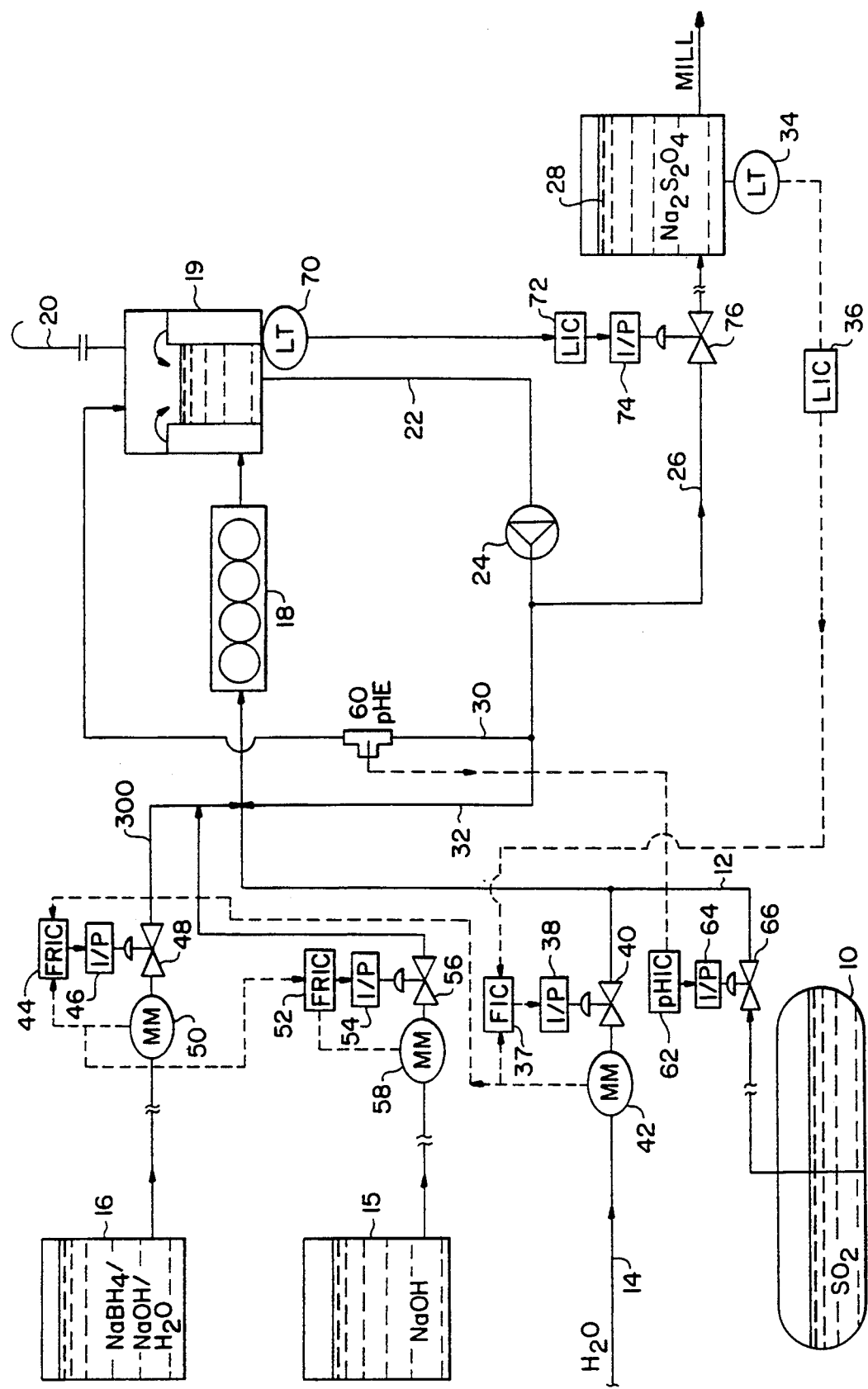
FIG. 5 is a flow diagram that illustrates the process shown in FIG. 2 modified in accordance with the present invention.
Figure 6:
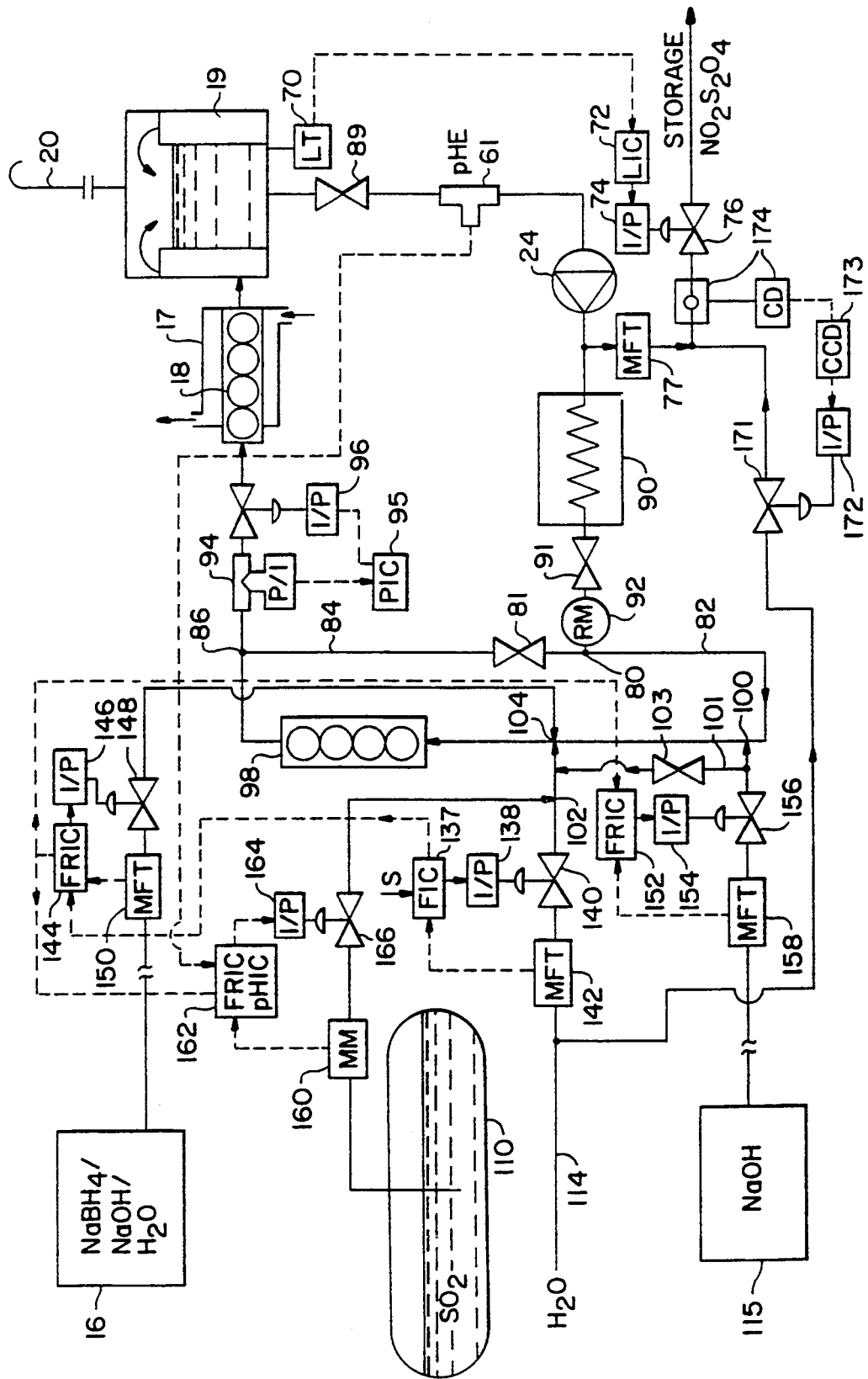
FIG. 6 is a flow diagram that illustrates the process shown in FIG. 3 modified in accordance with the present invention.
Figure 7:
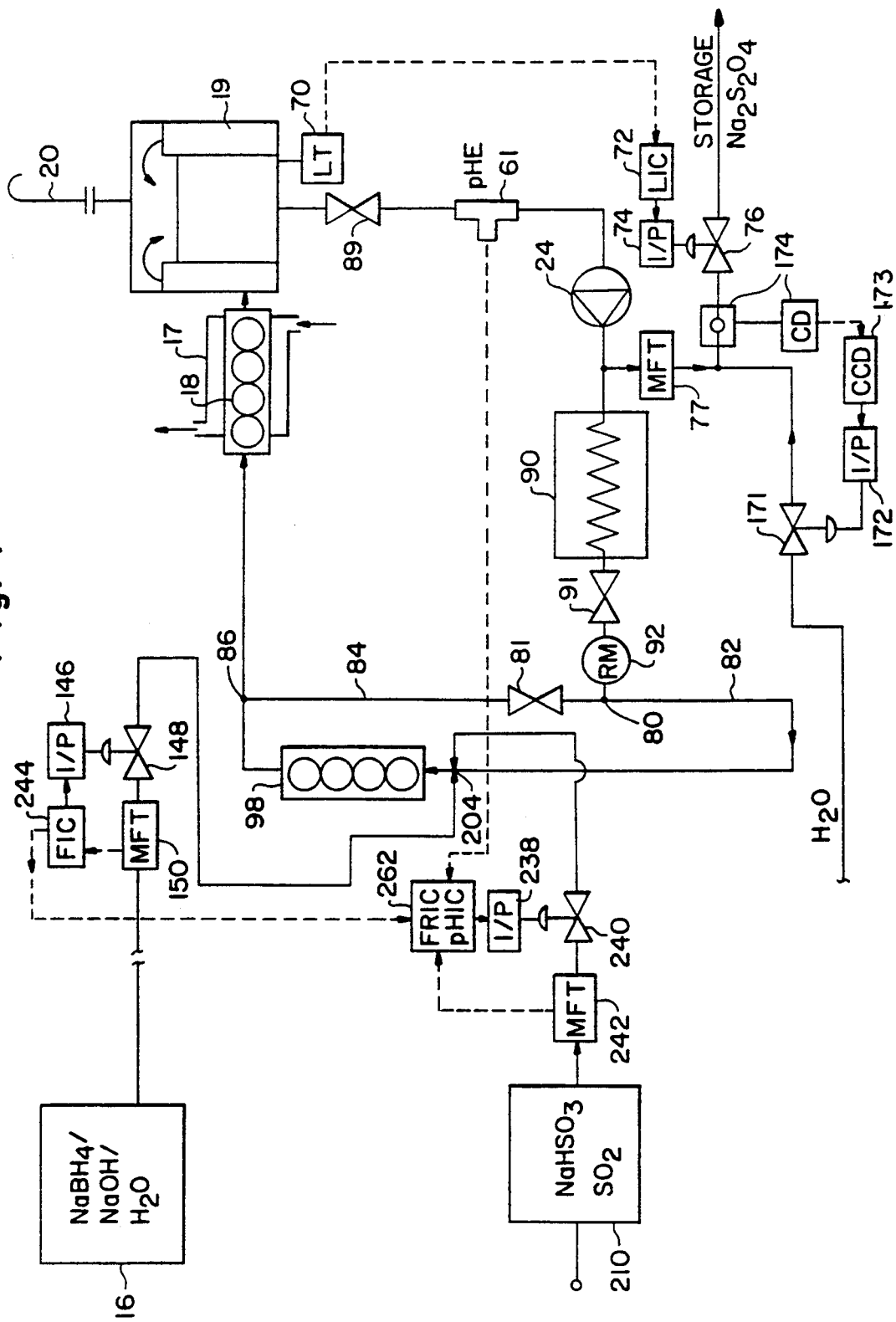
FIG. 7 is a flow diagram that illustrates the process shown in FIG. 4 modified in accordance with the present invention.

FIGS. 5, 6, and 7 are systems in accordance with the invention and are variations of FIGS. 2, 3, and 4, respectively. In these FIGS., components which are identical to those of the corresponding figure are given the same reference numeral and will not be described in detail. FIGS. 5, 6, and 7 illustrate various ways in which the feed systems of the prior art can be altered to permit the BOROL mixture to be added to the system simultaneous to the addition of the acidic sulfur-containing compound or precursors thereof containing stream, consistent with the invention.

Specifically, FIG. 5 illustrates an embodiment of the invention wherein the feeds from the storage tanks 15 and 16, i.e., NaOH solution and BOROL solution, respectively, are combined to form a stream 300. Similarly, water from the supply line 14 and liquid sulfur dioxide from the tank 10 are combined in the flow line 12. The flow stream 300 and the flow line 12 are simultaneously contacted with each other and the hydrosulfite solution recycle flow line 32 proximate to the mixer 18. Such simultaneous contacting of the feeds is dramatically different from the specific ordered, sequential introduction arrangements of the prior art. By means of the simultaneous contacting of reactant feeds of the invention, the advantages resulting from at least maintaining the alkalinity of the sodium borohydride-containing solution until necessary to effect reaction to produce sodium hydrosulfite can be realized.

While FIG. 5 shows combining the NaOH solution and the BOROL solution prior to contact with the flow line 12 (water + $SO_2$) and the hydrosulfite solution recirculation flow line 32, it is of course to be understood that, if desired, in practice, the NaOH solution could, additionally or alternatively, be added simultaneously with the introduction of the flow lines 12 and 32. In such a way, the alkalinity of the sodium borohydride-containing solution is maintained, consistent with the invention.

In general, however, the early addition of the caustic solution to the BOROL solution will be preferred, at least to the extent that such early addition will serve to increase the alkalinity of the sodium borohydride-containing solution for as was pointed out above, the sodium borohydride is less susceptible to hydrolysis at higher alkalinities. For example, the addition of a caustic solution containing 50 wt. % NaOH will act to increase the alkalinity of such sodium borohydride-containing solutions which contain only 40 wt. % NaOH.

FIG. 6 illustrates another embodiment of the invention. In this embodiment, sulfur dioxide and water and the BOROL solution are simultaneously contacted with the flow line 82 (containing recirculated sodium hydrosulfite and added NaOH solution) at the location 104. This simultaneous introduction arrangement and the advantages resulting from at least maintaining the alkalinity of the sodium borohydride-containing solution until necessary to effect reaction to produce sodium hydrosulfite differs from the specific ordered, sequential introduction arrangements of the prior art.

FIG. 7 illustrates yet another embodiment of the invention. In this embodiment, sulfur dioxide and sodium bisulfite from the supply 210 and BOROL solution from the tank 16 are simultaneously introduced proximate to the motionless mixer 98 at the location 204.

In the practice of the invention, improved results and reactivity are generally obtained through intimate mixing of the additives and the process flow stream. Because of cost effectiveness, low maintenance requirements and compatibility with such process flow streams, a preferred mode of mixing is that of using a motionless mixer. In general, it is preferable that the additives be introduced to the process flow stream at a location proximate to the mixer; preferably at a distance prior to the entrance of the mixer that is about the same as the diameter of the mixer in order to obtain optimal mixing effects.

FIG. 8 is a simplified schematic drawing of an input nozzle generally designated by the reference numeral 801, in accordance with one embodiment of the invention. Such an input nozzle facilitates and permits the simultaneous introduction/contacting of various reactants into the system. In FIG. 8, the main flow, e.g., a process flow stream such as that of recirculating sodium hydrosulfite and sodium bisulfite such as shown as flow line "32" in FIG. 5 and "82" in FIGS. 6 and 7, is here indicated by the reference numeral 802. The input nozzle 801 permits the simultaneous introduction into the process flow line 802 of both a first reaction mixture of BOROL solution or, preferably, BOROL solution to which sodium hydroxide of sufficient alkalinity has been added so as to increase the alkalinity of the sodium borohydride-containing solution, and a second reaction mixture of an acidic sulfur-containing compound or precursors thereof, as described herein and with the process flow line 802 feeding into a mixer 803.

The nozzle 801 has a central port 804 which emits the first reaction mixture into the line 802 and an outer annular port 808 which emits the second reaction mixture into the line 802. In practice, the emissions from both the central port 804 and the annular port 808 into the line 802 are coincident to each other, consistent with the simultaneous introduction/contacting preferred in the practice of the invention. Further, in an especially preferred embodiment of the input nozzle of the invention the annular port is concentric with the central port to facilitate the simultaneous introduction/contacting of the invention. In addition, to further facilitate such simultaneous introduction/contacting, the velocities of the streams emitted from the ports 804 and 808, respectively, are, in one preferred embodiment of the invention, equal to each other.

While the input nozzle of the invention has been described above with the central port emitting the sodium borohydride-containing mixture, and the outer annular port emitting the described second reaction mixture, it is of course to be understood, that if desired, the mixtures being emitted from these ports can be reversed. In practice, however, in view of the relative amounts of these mixtures which will flow through the ports, it is generally not practical to reverse the mixtures being emitted from the ports since such reversal would generally result in the annular space between the inner wall and the outer wall of the input nozzle being relatively very small, and as such, would be prone to plugging from particulate contamination. In order to facilitate production of commercially reliable input nozzles, port emissions as described relative to FIG. 8 will be preferred.

It is further to be understood that if desired or preferred the cross-section of the nozzle can take various shapes or forms which in addition to circular can, for example, include square, oblong, rectangular or similar shapes or forms as practical.

It is still further to be understood that the simultaneous introduction/contacting of the invention can be realized by alternative means such as a combination of two or more single feed input nozzles radially entering the recirculation stream perpendicular to the recirculation flow with the exit of each input nozzle at the same relative downstream position within the recirculation line, or a combination of two or more single feed input nozzles grouped together at the center of the recirculation line running parallel and separate from each other, rather than concentric with the exit of each nozzle, at the same relative downstream position with the recirculation streaming, for example.

The system described above has been found to lead to yields of greater than 90% and preferably greater than about 94%, e.g., in the range of about 94% to about 97%; an improvement over the prior art system as described above. The important factors in achieving this are believed to be the creation of a more stable, alkaline medium for the $NaBH_4$ by at least maintaining, and preferably increasing, the alkalinity of the sodium borohydride-containing solution until such time as it is necessary to effect reaction of the sodium borohydride to produce sodium hydrosulfite; the simultaneous introduction of both the sodium borohydride-containing solution and a reaction mixture of an acidic sulfur-containing compound or precursors thereof used in producing sodium hydrosulfite from sodium borohydride; the provision of rapid and intimate mixing of the chemical reactants within short intervals as accomplished by means of a motionless mixer and nozzles and the provision of means such as the described input nozzle, e.g., a nozzle with a central port and an outer annular port, permitting the simultaneous and coincident emission of two different materials.

It is to be further understood that while the invention has been more specifically described above in reference to processing utilizing a reaction mixture of an acidic sulfur-containing compound or precursors thereof used in producing sodium hydrosulfite from sodium borohydride such as 1) an aqueous solution of sodium bisulfite and sulfur dioxide or 2) sulfur dioxide and water, the invention also has applicability and utility in similar processing utilizing other acid sulfur-containing compounds or precursors such as a mixture of sodium bisulfite and sulfuric acid, for example.

Such processing may in fact be preferred in certain circumstances and under certain conditions. For example, sulfuric acid/sodium bisulfite mixtures may be preferred over the use of sulfur dioxide solutions on the basis of availability, reduced capital requirements and/or posing less of a hazard than liquid sulfur dioxide.

The system and operation thereof when using a sulfuric acid/sodium bisulfite solution is quite similar to those described above in reference to processing utilizing solutions of sulfur dioxide. Typical reaction chemistry for such processing can be represented by the following equation:

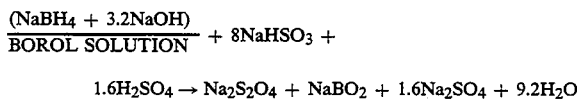

$$1.6H_2SO_4 \rightarrow Na_2S_2O_4 + NaBO_2 + 1.6Na_2SO_4 + 9.2H_2O$$

Typically, an aqueous solution of sodium bisulfite will be mixed with a solution of sulfuric acid to form an acidic reaction combination. When used in conjunction with an input nozzle such as that described above with reference to FIG. 8, the acidic reaction combination will preferably be emitted into the process flow line through the outer annular port with the sodium borohydride-containing solution emitted through the central port of the nozzle. Alternatively, the choice of ports for the emissions of the solutions can, if desired, be reversed with the acidic reaction combination being emitted through the central port and the sodium borohydride-containing solution being emitted through the annular port. In either case and consistent with the invention, the alkalinity of the sodium borohydride-containing solution is at least maintained prior to contact with an acidic reaction combination. More specifically, the sodium borohydride-containing solution, e.g., BOROL solution, sodium bisulfite/sulfuric acidic reaction combination solution and, if desired, a recirculation stream of sodium hydrosulfite all simultaneously initially come into contact with each other.

In addition and consistent with the above, the diameter of the related sections of the nozzle assembly can be adjusted as necessary, for example, so as to provide that the separate reactant streams are each emitted at the substantially same velocity, as may be preferred.

As before, flow measuring and control equipment is typically used to measure and adjust the flow of the various process stream materials, e.g., BOROL solution, sodium bisulfite solution, and, if necessary, dilution water. Also, as before, a pH measurement of the product sodium hydrosulfite stream can be used to adjust the final control element which, in this case, is the flow rate of the sulfuric acid stream. In general, all other significant design criteria for this system, such as degassing of hydrogen by product, heat removal, etc., remain unchanged.

The present invention is described in further detail in connection with the following examples which illustrate various aspects involved in the practice of the invention. It is to be understood that all changes that come within the spirit of the invention are desired to be protected and thus the invention is not to be construed as limited by these examples.

EXAMPLES

COMPARATIVE EXAMPLE 1

In a system as shown in FIG. 2, the mixture of water and sulfur dioxide was added to the process stream before the solution of NaOH and the BOROL solution, and rapid and intimate mixing was not ensured. The BOROL solution for this and all other examples is 12 wt. % sodium borohydride, 40 wt. % sodium hydroxide and 48 wt. % water. The NaOH solution used in this example was 20 wt. % NaOH. The NaOH solution used in the other examples was 50 wt. % NaOH. The system operating parameters and results are identified in Table 2, below.

COMPARATIVE EXAMPLE 2

In this comparative example, a system as depicted in FIG. 2 was used, however, with the NaOH solution flow replaced with a sodium bisulfite solution. The bisulfite solution was first added to the solution of water and SO2 to form a mixture of bisulfite/SO2/H20 which was then added to the process stream upstream of the BOROL solution. As in Comparative Example 1, rapid and intimate mixing was not ensured. The system operating parameters and results are also identified in Table 2, below.

COMPARATIVE EXAMPLE 3

In this comparative example, a system as depicted in FIG. 2 was used, however, using a two-compartment motionless mixer with the solution of water and SO2 introduced to the process stream flow line prior to the first compartment of the mixer and the mixture of BOROL solution and NaOH solution introduced proximate to the second mixing compartment. Chemical reactant addition was accomplished with nozzles located no more than one (1) mixer diameter upstream of the respective mixing stage such that rapid and intimate mixing was ensured. The system operating parameters and results are also identified in Table 2, below.

COMPARATIVE EXAMPLE 4

In this comparative example, a system as depicted in FIG. 2 was used, however, with the BOROL solution and NaOH solution being introduced and mixed with the process flow stream line prior to the introduction and mixing with of the sulfur dioxide and water. The system was similar to that of FIG. 5 of U.S. Pat. No. 5,094,833, also identified in Table 2, below.

TABLE 2

| | COMPARATIVE EXAMPLES | | | |
|---|---|---|---|---|
| | 1 | 2 | 3 | 4 |
| FLOW RATES (US gpm) | | | | |
| BOROL solution | 0.168 | 0.255 | 0.130 | 0.135 |
| NaOH solution | 0.495 | — | 0.150 | 0.158 |
| Sodium Bisulfite solution | — | 1.43 | — | — |
| Liquid $SO_2$ | 0.260 | 0.180 | 0.233 | 0.238 |
| Water | 7.35 | 26.0 | 16.1 | 16.8 |
| REACTION pH | 6.2 | 6.2 | 6.3 | 6.3 |
| REACTION TEMPERATURE (°F.) | 83 | 75 | 55 | 78 |
| RECIRCULATION FLOW RATE (US gpm) | 30 | 50 | 60 | 35 |
| ACTUAL HYDROSULFITE (%) | 5.08 | 2.27 | 2.04 | 2.15 |
| THEORETICAL HYDROSULFITE (%) | 6.02 | 2.73 | 2.35 | 2.34 |
| % YIELD | 84.4 | 83.2 | 86.8 | 91.8 |

EXAMPLES 1-6

A simplified unit was designed and constructed to permit the simultaneous introduction of chemical reactants, in accordance with the invention. In these examples, the initial reactants were BOROL solution, caustic (50% NaOH) and $SO_2$/water. In Examples 1-3, the first chemical reactant stream was made up of the BOROL solution. The second chemical reactant stream was formed by adding the caustic to the $SO_2$/water. In Examples 4-6, the first chemical reactant stream was formed by adding the caustic to the BOROL solution and the second chemical reactant stream was $SO_2$/water.

In each of the Examples 1-6, the two chemical reactant stress were simultaneously introduced with the product stream recirculation flow, in accordance with the invention. The operating parameters and results of these examples are identified in Table 3, below.

TABLE 3

| | EXAMPLES | | | | | |
|---|---|---|---|---|---|---|
| | 1 | 2 | 3 | 4 | 5 | 6 |
| FLOW RATES (US gpm) | | | | | | |
| BOROL solution | 0.295 | 0.284 | 0.289 | 0.283 | 0.292 | 0.281 |
| 50% NaOH solution | 0.346 | 0.359 | 0.380 | 0.363 | 0.376 | 0.357 |
| Liquid $SO_2$ | 0.622 | 0.621 | 0.645 | 0.625 | 0.650 | 0.626 |
| Water | 26.47 | 26.17 | 26.22 | 26.42 | 26.06 | 26.52 |
| REACTION pH | 6.15 | 6.16 | 6.13 | 6.16 | 6.13 | 6.08 |
| REACTION TEMPERATURE (°F.) | 87 | 87 | 87 | 87 | 87 | 87 |
| RECIRCULATION FLOW RATE (US gpm) | 90 | 90 | 90 | 90 | 90 | 90 |
| ACTUAL HYDROSULFITE (%) | 3.01 | 2.96 | 3.02 | 2.96 | 3.00 | 2.93 |
| THEORETICAL HYDROSULFITE (%) | 3.18 | 3.10 | 3.14 | 3.06 | 3.19 | 3.03 |
| % YIELD | 94.7 | 95.5 | 95.6 | 96.7 | 94.0 | 96.7 |

AVG. % YIELD Ex. 1-3 = 95.2
AVG. % YIELD Ex. 4-6 = 95.8

DISCUSSION OF RESULTS

Comparative Examples 1 and 2 illustrate typical yields when rapid and intimate mixing were not present. In Comparative Example 3, when rapid and intimate mixing were present, the percent yield increased by 3 to 4 percent. Rapid and intimate mixing of the chemical reactants, particularly the mixture of BOROL solution and NaOH solution, minimizes the time and severity of a pH gradient in the process stream through a pH range below the desired reaction pH of 5.5-6.5; therefore, the hydrolysis of $NaBH_4$ was limited.

The hydrolysis of $NaBH_4$ was further limited by adding the mixture of BOROL solution and NaOH solution first to process stream with rapid and intimate mixing as described in U.S. Pat. No. 5,094,833. Comparative Example 4 illustrates the yields which, compared to Comparative Example 3, provided a yield increase of 4-5 percent and 7-9 percent compared to Comparative Examples 1 and 2.

The yield of sodium hydrosulfite increased even more, to greater than 95%, when utilizing the simultaneous contacting of the sodium borohydride-containing solution and the solution of acid sulfur-containing compounds or precursors thereof used in producing sodium hydrosulfite from sodium borohydride as was done in Examples 1-3, in accordance with the invention.

The yield of sodium hydrosulfite was even greater for the average of Examples 4-6 wherein the 50 wt. % NaOH solution was added to the BOROL solution prior to simultaneously contacting the recirculation stream and the $SO_2$/water stream. Such a result is consistent with the invention as the addition of a 50 wt. % NaOH aqueous solution to a BOROL solution of 12 wt. % $NaBH_4$, 40 wt. % NaOH and 48 wt. % $H_2O$ would serve to increase the alkalinity and pH of the sodium borohydride solution and thereby improve the stability of the $NaBH_4$ in the solution.

Table 4, below, is a summary table that highlights key differences between the various Comparative Examples ("CE") and Examples ("E") and the improvement in yield attained through the practice of the invention, whereby by means of the simultaneous contacting of reactant feeds the alkalinity of the sodium borohydride-containing solution is at least maintained until necessary to effect reaction to produce sodium hydrosulfite.

TABLE 4

SUMMARY TABLE

| | Rapid-intimate Mixing | Order of Reactant Addition | % Yield |
|---|---|---|---|
| CE 1 | — | sequential-acidic first | 84.4 |
| CE 2 | — | sequential-acidic first | 83.2 |
| CE 3 | — | sequential-acidic first | 86.8 |
| CE 4 | | sequential-alkaline borohydride first | 91.8 |
| E 1 | | simultaneous | 94.7 |
| E 2 | | simultaneous | 95.5 |
| E 3 | | simultaneous | 95.6 |
| E 4 | | simultaneous* | 96.7 |
| E 5 | | simultaneous* | 94.0 |

TABLE 4-continued
SUMMARY TABLE

| | Rapid-intimate Mixing | Order of Reactant Addition | % Yield |
|---|---|---|---|
| E 6 | | simultaneous* | 96.7 |

* denotes addition of a 50 wt % NaOH aqeuous solution to a BOROL solution of 12 wt % NaBH$_4$, 40 wt % NaOH and 48 wt % H$_2$O prior to simultaneous contact with the recirculation stream and the SO$_2$/water stream.

The foregoing detailed description is given for clearness of understanding only, and no unnecessary limitations are to be understood therefrom, as modifications within the scope of the invention will be obvious to those skilled in the art.

What is claimed is:

1. A method for producing sodium hydrosulfite comprising the steps of:
   a) establishing a parent flow stream comprising an aqueous mixture of at least sodium hydrosulfite and sodium bisulfite; and
   b) adding a first reaction mixture comprising sodium borohydride, sodium hydroxide and water and a second reaction mixture comprising,
      i) an aqueous solution of sodium bisulfite and sulfur dioxide,
      ii) sulfur dioxide and water, or
      iii) an aqueous solution of sodium bisulfite and sulfuric acid,
   to said parent flow stream at the same point to form an aqueous solution containing additional sodium hydrosulfite.

2. The method of claim 1 wherein said first reaction mixture is formed by adding sodium hydroxide with BOROL solution.

3. The method of claim 1 wherein said addition is done by means of an input nozzle.

4. The method of claim 3 wherein said input nozzle comprises a central port which emits said first reaction mixture into said process flow stream and an outer annular port which emits said second reaction mixture into said process flow stream coincident to said emission of said first reaction mixture, said annular port being concentric with said central port.

5. The method of claim 1 wherein said second reaction mixture comprises an aqueous solution of sodium bisulfite and sulfur dioxide.

6. The method of claim 1 wherein said second reaction mixture comprises sulfur dioxide and water.

7. The method of claim 1 wherein said second reaction mixture comprises sodium bisulfite and sulfuric acid.

* * * * *

UNITED STATES PATENT AND TRADEMARK OFFICE
CERTIFICATE OF CORRECTION

PATENT NO. : 5,336,479
DATED : August 9, 1994
INVENTOR(S) : Munroe

It is certified that error appears in the above-identified patent and that said Letters Patent is hereby corrected as shown below:

Column 3, line 50  change "similarly" to --Similarly--

Column 13, line 37  change "$Na_2S_2O_4$" to --$4Na_2S_2O_4$--

Column 15, line 35  change "stress" to --streams--

Column 15, line 45  change "NaoH" to --NaOH--

Signed and Sealed this

First Day of November, 1994

Attest:

BRUCE LEHMAN

*Attesting Officer*   *Commissioner of Patents and Trademarks*